United States Patent [19]

Keller et al.

[11] 4,293,872
[45] Oct. 6, 1981

[54] PRODUCTION OF PRINTING BLOCKS OR FORMS

[75] Inventors: Hans Keller, Kiel; Hans-Georg Knop, Heikendorf, both of Fed. Rep. of Germany

[73] Assignee: Dr.-Ing. Rudolf Hell GmbH, Kiel, Fed. Rep. of Germany

[21] Appl. No.: 59,214

[22] Filed: Jul. 20, 1979

[30] Foreign Application Priority Data

Jul. 24, 1978 [DE] Fed. Rep. of Germany ....... 2832467

[51] Int. Cl.³ .............................................. H04N 1/38
[52] U.S. Cl. ...................................... 358/75; 358/78; 358/80
[58] Field of Search .............................. 358/75, 78, 80

[56] References Cited

U.S. PATENT DOCUMENTS

| | | | |
|---|---|---|---|
| 3,739,078 | 6/1973 | Pugsley | 358/80 |
| 3,878,559 | 4/1975 | Pugsley | 358/75 |
| 3,887,939 | 6/1975 | Hunt | 358/75 |
| 3,894,178 | 7/1975 | Pugsley | 358/80 |
| 4,054,916 | 10/1977 | Knop | 358/75 |

FOREIGN PATENT DOCUMENTS 891978  3/1962  United Kingdom .................. 358/75

*Primary Examiner*—Robert L. Griffin
*Assistant Examiner*—Michael Allen Masinick
*Attorney, Agent, or Firm*—Brisebois & Kruger

[57] ABSTRACT

This invention relates to the production of a printing block or form of the kind in which at least one original is scanned optoelectronically to obtain image signals being mixed to generate a composite signal and is recorded as the printing block or form, one of the image signal which is to be mixed being modulated by a control signal and the other image signal being modulated by the amplitude-inverted control signal and the modulated image signals being summated to obtain said desired composite signal, said control signal determining a mixing range and the mixing characteristic within said mixing range.

According to the invention, the said control signal is derived from the color information of a colored control mask by scanning said mask or from the image content of the original.

13 Claims, 9 Drawing Figures

PRODUCTION OF PRINTING BLOCKS OR FORMS

BACKGROUND OF THE INVENTION

The present invention relates to the production of a printing block or form of the kind in which at least one original is scanned optoelectronically to obtain image signals these being mixed to generate a composite signal which is recorded as the printing block or form. One of the image signals which is to be mixed is modulated by a control signal and the other image signal is modulated by the amplitude-inverted control signal the modulated image signals being summated to obtain said desired composite signal, said control signal determining a mixing range and the mixing characteristic within said mixing range. Hereinafter such a method of producing printing blocks or formes will be referred to as "of the kind described".

Such a method was introduced to satisfy the demand for gradually extending transitions between one picture and another which frequently arises in copying pictures in mutually interposed positions. It is equally desirable in the case of a variety of corrective tasks, to allow the action of a correcting operation to set in or die out gradually.

The evolution of the control signal in a method of the kind described determines the extent of the mixing range and the transitional characteristic of the signals which are to be mixed. The signal in question is a two-level signal per se, which gradually rises or sinks within the mixing range.

A control signal of this nature, hereinafter referred to as a diffuse control signal, is obtained in a prior proposal by low-definition scanning of a control mask by means of an ambient field diaphragm, the change of the signal level along a mask outline not occurring suddenly but gradually or smoothly. This evolution of the control signal may also be derived by sharply focussed scanning of the control mask under simultaneous evaluation of the picture dots surrounding the picture spot actually scanned (ambient field) or by evaluating particular properties (colouration, tonal value, etc.) of the image original.

In an embodiment according to the said prior proposal, a black/white control mask is scanned. The application of a black/white control mask has the disadvantage however that one control signal only may be obtained unless use is made of several such control masks and several scannings elements, which would be very costly. The reader's attention is directed to co-pending application Ser. No. 879,596.

The problem inherent in controlling a number of smooth transitions at the same time, e.g. if it is intended to copy several image originals in mutually interposed positions at the same time and/or to perform several colour or tonal value corrections in different areas of the originals at the same time.

It is already known from U.S. Pat. No. 3,621,126 that several control signals may be obtained by scanning a coloured control mask, for copying images in mutually interposed positions. This known system however provides sharply defined control signals only, i.e. signals incorporating a sudden variation of the signal level, so that it is inappropriate for obtaining the required evolutions.

The manner in which a definition signal may be switched adjunctively and disjunctively for particular areas of the image original as a function of specific properties (contrast, brightness, colour) of the image original or of a control mask, is furthermore described in U.S. Pat. No. 4,005,475. The action of the definition signal on the image signal may however be controlled in irregular manner only and not whilst setting in or diminishing gradually, even with this known circuitry.

To this must be added that sharply defined as well as gradual transitions are frequently required. For example, pictures and textual matter are to be copied in mutually interposed positions in sharply delimited manner and different gradual corrections are to be performed at the same time.

SUMMARY OF THE INVENTION

In a method of the kind described, it is an object of this invention substantially to avoid the shortcomings and to improve the process specified in the prior proposal aforementioned and accordingly, in such a method the invention consists in deriving said control signal from the colour information of a control mask by scanning the mask.

BRIEF DESCRIPTION OF THE DRAWINGS

In order that the invention may be more clearly understood reference will now be made to the accompanying drawings which show certain embodiments thereof by way of example and in which.

DETAILED DESCRIPTION OF PREFERRED EMBODIMENTS

Figure 1:
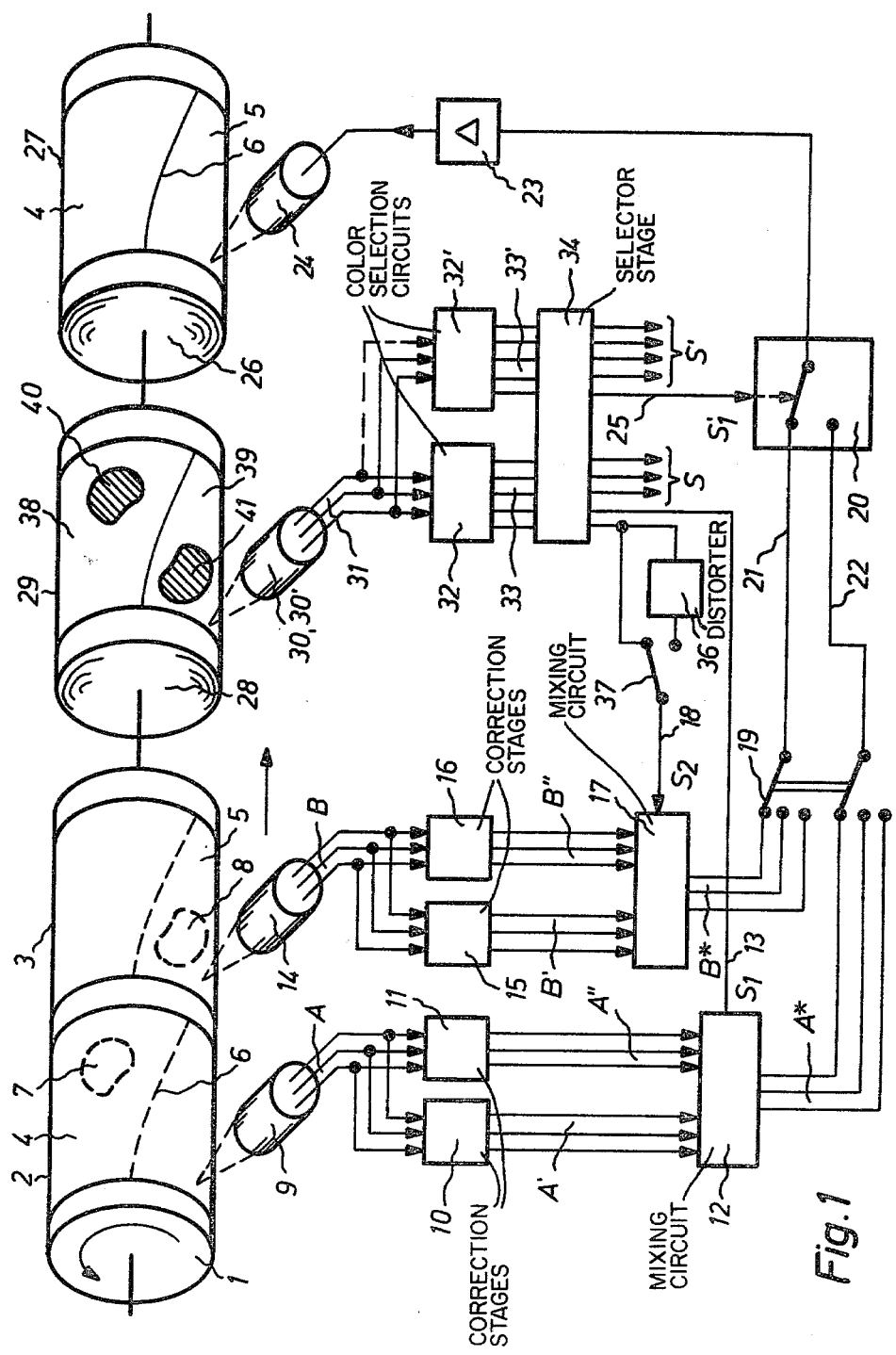
FIG. 1 shows an example of the application of the invention to a colour scanner.

Referring now to the drawings, FIG. 1 shows the fundamental structure of a colour scanner with which it is possible for example to copy image originals in sharply defined manner in mutually interposed positions, whilst at the same time performing different areal corrections with gradual transitions. The data required for controlling the actions are generated by scanning a coloured control mask.

Two coloured image originals 2 and 3 whereof the partial pictures 4 and 5 are to be combined in the reproduction and whereof the transitions are to look sharply defined at the dashed line 6, are mounted on a rotary scanning drum 1. It is also desirable at the same time to have colour and/or tonal value corrections for the areas 7 and 8 shown by dashed lines, and for the corresponding partial pictures 4 and 5 the connections occurring on the other hand, with gradual variation of the corrective action in one area of transition at the areal boundaries.

An optoelectronic scanning element 9 which is displaced axially along the scanning drum 1 scans the image original 2 by dots and lines, and the triple colour signal A concomitantly obtained is fed simultaneously to two correction stages 10 and 11, whereof the one is preset for correction of the partial picture 4 and the other for correction of the area 7.

The differently corrected triple chromatic selection signals A' and A" at the output terminals of the corrector stages 10 and 11 are mixed in a mixing circuit 12 as a function of a diffuse control signal $S_1$ carried on a conductor 13, in such manner that a gradual corrective variation occurs in the transitional area at the edge of the area 7.

A scanning element 14 scans the second image original 3, and the triple colour signal B is equally exposed to different corrections for the partial picture 5 and the area 8 in two complementary corrector stages 15 and 16.

The corresponding triple chromatic selection signals B' and B" are mixed in a second mixing circuit 17 as a function of a diffuse control signal $S_2$ carried on a conductor 18.

Figure 8:
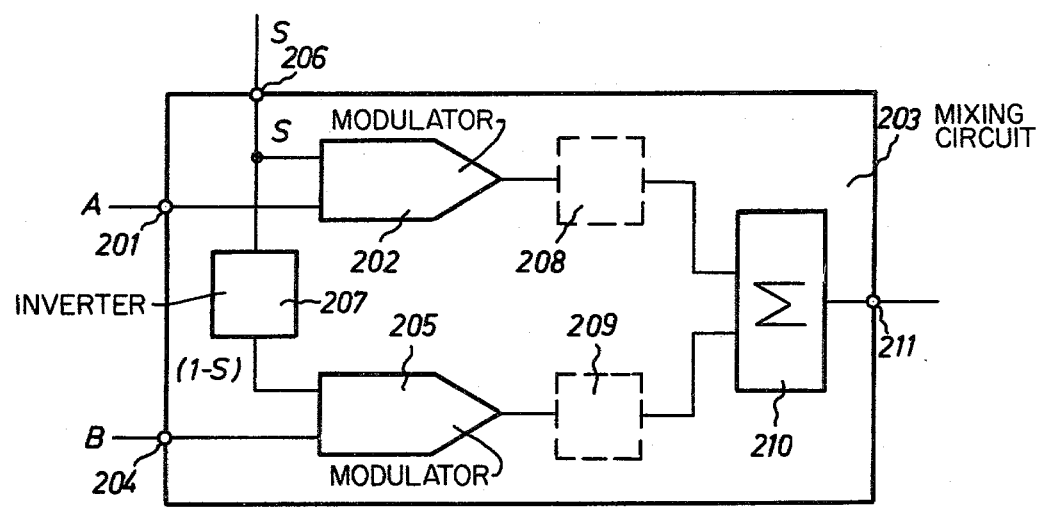
FIG. 8 shows an example of embodiment for a mixing circuit and FIG. 9 shows a graphic illustration of signal evolutions.

The fundamental structure of a mixing circuit will be apparent from FIG. 8 which is similar to FIG. 1 of the aforementioned prior proposal, namely co-pending application Ser. No. 879,596. However the mixing circuits 12 and 17 are enlarged as compared to the system depicted in the prior proposal because of the greater number of input and output signals. The triple chromatic selection signals A* and B* mixed in the mixing circuits 12 and 17 are fed to a colour separation selector switch 19 whereby the appropriate colour separation signals are selected for recording one of the chromatic selections "magenta", "cyan" and "yellow".

The sharply defined interpositional copying of the partial pictures 4 and 5 is controlled by an electronic reversing switch 20 which is symbolised as a mechanical reversing switch in this embodiment. The reversing switch 20 alternately switches the colour separation signals selected on the chromatic selection switch 19 on the conductors 21 and 22, to a terminal amplifier 23 and to a recording lamp 24 acting as a recording element. In accordance with the desirable sharply defined image pattern, the electronic reversing switch 20 is controlled by a sharply defined control signal $S'_1$ carried on a conductor 25.

A film 27 is installed as a recording medium on a revolving recording drum 26. The recording lamp 24 whereof the brightness is modulated by the chromatic selection signal selected on the electrical reversing switch 20 is displaced along and parallel to the recording drum 26 and performs the point by point and line by line exposure of the film 27.

The exposed and developed film represents the required chromatic selection of the electronically interpositionally copied partial pictures 4 and 5, which are sharply delimited from each other at the line 6.

Deviating from the embodiment depicted, the recording of the chromatic selections may obviously be performed simultaneously by means of several recording elements arranged parallel beside one another, or serially under adjunctive switching of storage systems, on the periphery of the recording drum 26.

Several different control signals which, in the embodiment, are obtained by scanning a coloured control mask, are required for controlling the actions described.

A coloured control mask 29, which contains the separate control data as different colour sections, is secured on a mask drum 28 revolving in synchronism and in precise register with the scanning drum 1.

The control mask 29 is scanned by points and lines by another optoelectronic scanning element 30. The scanned colours, or rather the R, G, B colour mensuration signals on the conductors 31 are analysed in colour selection circuits 32 and 32', in such manner that each time one of the colour sections of the control mask 29 is scanned, a poorly defined control signal S characteristic of the colour section scanned appears at the output terminal 33 of the colour selection circuit 32 and that a corresponding distinct control signal S' appears at the output terminal 33' of the colour selection circuit 32'. The selector stage 34 which allows preselection whether the distinct control signal S' or the corresponding poorly defined control signal S is to have priority, is connected to the colour selection circuits 32 and 32'.

In a preferred embodiment, the poorly defined control signal S for example may be distorted to a selectible degree by non-linear amplifiers, so that the signal graph within the mixing range is no longer linear but random. The mixing range which normally extends symmetrically with respect to the picture spot diaphragm of the scanning element 30 may thereby be displaced in the scanning direction towards the rim of the picture spot diaphragm, so that the mixing range lies a little outside or inside the range boundaries of the control mask 29. Partial pictures may be recorded with greater mutual overlap in this manner.

A distorter 36 of this nature is incorporated in the conductor 18 in the embodiment, the distorted or the undistorted control signal $S_2$ being capable of being applied to the mixing circuit 17 by means of a switch 37, depending on reproduction requirements.

The generation of the control signals is to be dealt with in particular in the following.

In the case of a sharply defined or distinct control signal S', as in that of the control signal $S'_1$, the transition from one signal level to the other occurs suddenly at the colour section boundaries of the control mask 29.

In the colour selection circuit 32', the R, G, B colour signals are compared in known manner to threshold values which delimit the individual colours with respect to each other, and the control signals S' are derived from the comparison results by means of logic circuits.

An embodiment of a colour selection circuit 32' of this nature is specified in particular in the German Pat. No. 2544703.

Figure 9:
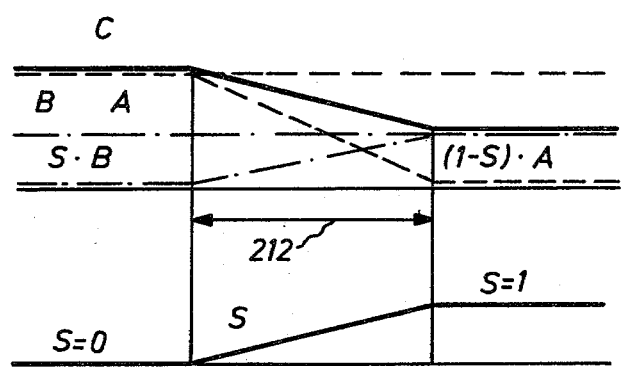

The poorly defined control signals S, such as $S_1$ and $S_2$, have the trace illustrated in FIG. 9, comprising two signal levels and a constant signal variation within the mixing range. FIG. 9 reproduces FIG. 2 of U.S. Pat. No. 875,596.

According to U.S. Pat. No. 875,596 referred to, the signal variation within the mixing range is obtained by scanning a control mask by picture dots, under analysis of the ambient field surrounding the picture dot actually scanned. This may be performed by calculation of ambient field data from stored picture dot data of the control mask 29, or as in the case of the example of embodiment, by diffuse scanning of the control mask 29, the R, G, B colour signals generated by the scanning element 30 already having the traces characteristic of the poorly defined control signals $S_1$ and $S_2$ within the mixing range.

In the case of diffuse scanning, the scanning element 30 for the control mask 29 has a diaphragm whose diameter is greater than that of the image dot diaphragm in the scanning elements 9 and 14 for the image originals 2 and 3, and thus corresponds to the diameter of the otherwise customary ambient field diaphragm. The extension of the mixing range may be determined in advantageous manner by altering the diaphragm diameter.

Figure 4:
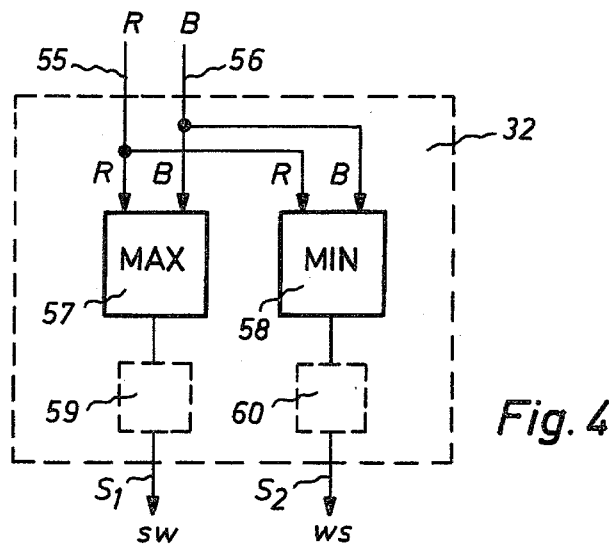
FIG. 4 shows an embodiment for a colour selection circuit.
Figure 5:
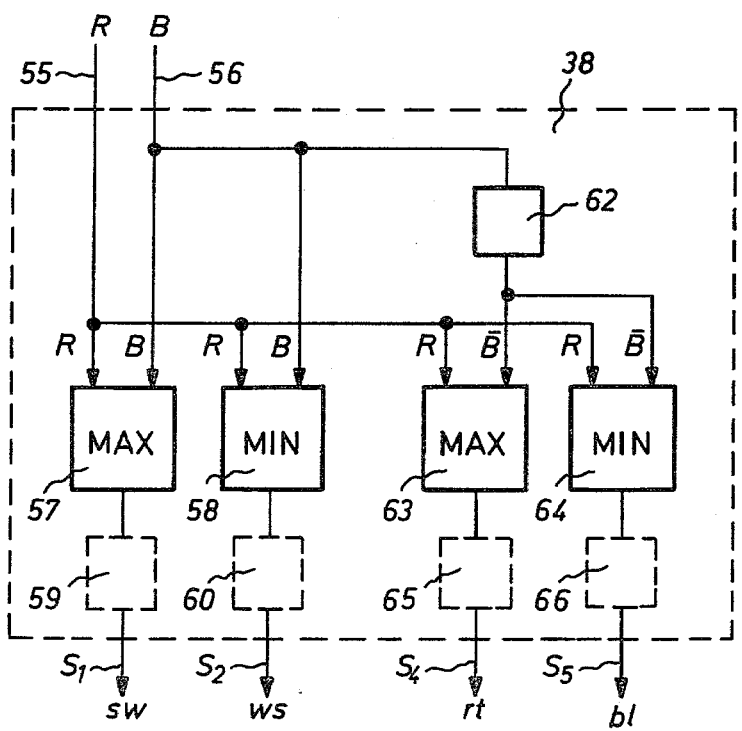
FIG. 5 shows another embodiment for a colour selection circuit.

The colour selection circuit 32 may be constructed in accordance with German Pat. No. 2628053, for example. Preferred embodiments of the colour selection circuit 32 are depicted in FIGS. 4 and 5.

Figure 2:
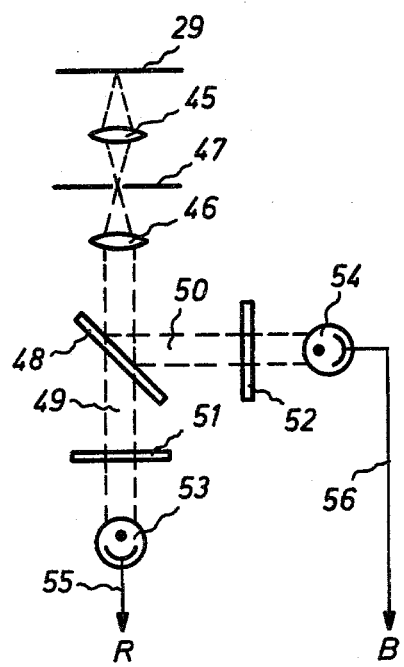
FIG. 2 shows an embodiment of a scanning element.

The number of control signals S and S' available at the output terminals 33 and 33' of the colour selection circuits 32 and 32' depends on the corresponding number or different colour sections of the control mask 29. Four colour ranges only are required in the embodiment. The partial picture 4 is positionally coordinated with the control range 38 with the colour "red" (rt), and the partial picture 5 with the colour range 39 with the colour "blue" (bl). The colour range 40 have the colour "white" (ws) is congruent with the section 7, and the colour range 41 having the colour "black" (sw) is congruent with the section 8. Use is made of a modified scanning element 30' which generates two colour mensuration signals only on the conductors 31, for identification of the four mask cocolourations. The scanning element 30' is depicted in FIG. 2. The colour selection circuits 32 and 32' concomitantly generate the following control signals.

In a first case, the poorly defined control signal $S_1$ provides an indication regarding "black" or "non-black" (not red, blue or white) of a colour section scanned off the control mask 29, and the poorly defined control signal $S_2$ provides a corresponding indication regarding "white" or "non-white" (not red, blue or black), the required gradual transitions occurring in each case at the edge of the black colour section 41 and of the white colour section 40. FIG. 4 shows an embodiment of the colour section circuit 32 for the first case.

In a second case, the colour selection circuit 32 may separate all four colour sections from each other, namely "black", "white", "red" and "blue", so that four poorly defined control signals S are available. A modified colour selection circuit 32 intended for the second case, is depicted in FIG. 5.

In both cases, the colour selection circuit 32' provides four sharply defined control signals S' for the colours "black", "white", "red" and "blue". FIG. 2 shows an embodiment for a modified scanning element 30' for scanning the control mask 29 in the eventuality in which no more than four colours, for example the four colours "black", "white", "red" and "blue" specified, are analysed.

The scanning beam incident from the control mask 29 via objectives 45 and 46 and a diaphragm 47 enlarged as compared to the normal pictured dot diaphragm, is divided by means of a partially transparent mirror 48 into two partial beams 49 and 50 which are fed via a red filter 51 and a blue filter 52 to the corresponding opto-electronic converters 53 and 54 to obtain the colour mensuration signals R and B on the conductors 55 and 56. Any other combination of colour mensuration signals may also be generated. What is decisive is that no more than two spectrum components of the coloured scanning beam are analysed in each case, whereby the three-dimensional colour space is reduced to a two-dimensional colour space as shown in FIG. 3.

Figure 3:
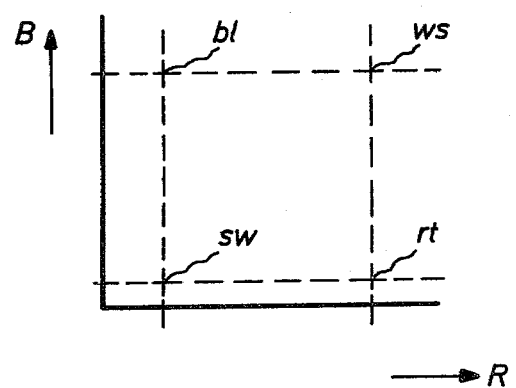
FIG. 3 shows a graph.

FIG. 3 shows a two-dimensional colour plane, the colour mensuration signal R being plotted on its abscissa, and the colour mensuration signal B being plotted on its ordinate. The graph illustrates the approximately amplitude spread of the colour mensuration signals for the mask colours "black", "white", "red" and "blue". By an appropriate selection of the colour applied on the control mask 29 and of the colour filters, it is accomplished that the characteristic mask colours form the corner points of a rectangle, thereby facilitating differentiation of the colours. The colour "white" provides high signal amplitudes, the colour "black" providing low signal amplitudes. In the case of the colours "red" and "blue" one of the signal amplitudes is high and the other low, in each instance.

FIG. 4 shows an embodiment for a colour selection circuit 32, in case of discrimination between "white" or "non-white", or rather between "black" or "non-black".

The colour mensuration signals R and B are fed to a maximum-selection stage 57 and to a minimum-selection stage 58. As apparent from the graph of FIG. 3, the output signal $S_1$ of the maximum-selection stage 57 has a high signal lever for the colours "red", "blue" and "white", that is to say for "non-black", and a low signal level for the colour "black" only. The output signal $S_1$ consequently is a specific signal for the colour "black". The output signal $S_2$ of the minimum-selection stage 58 provides a low signal level for the colours "red", "blue" and "black", that is to say for "non-white", and a high signal level for the colour "white" only, so that the output signal $S_2$ represents a specific signal for the colour "white".

The output signals $S_1$ and $S_2$ are the required control signals which may be inverted in amplitude as required, in post-connected inverters 59 and 60.

FIG. 5 shows an embodiment of the colour selection circuit 32 in the case in which all four colours are to be selected. As compared to the colour selection circuit illustrated in FIG. 4, the colour selection circuit 32 is enlarged by an inverter 62 for the colour mensuration signal B and by another maximum-selection stage 63 and a minimum-selection stage 64.

The output signal $S_4$ of the maximum-selection stage 63 provides a high signal level for the colours "black", "white" and "blue", and a low signal level for the colour "red" only. Consequently, the output signal $S_4$ is a specific signal for the colour "red". The signal level of the output signal $S_5$ at the minimum-selection stage 64 is low on the contrary for the colours "black", "white" and "red" and is high only for the colour "blue". Consequently, the output signal $S_5$ is specific for the colour "blue".

The output signals $S_4$ and $S_5$ may also be inverted in amplitude by means of inverters 65 and 66.

Figure 6:
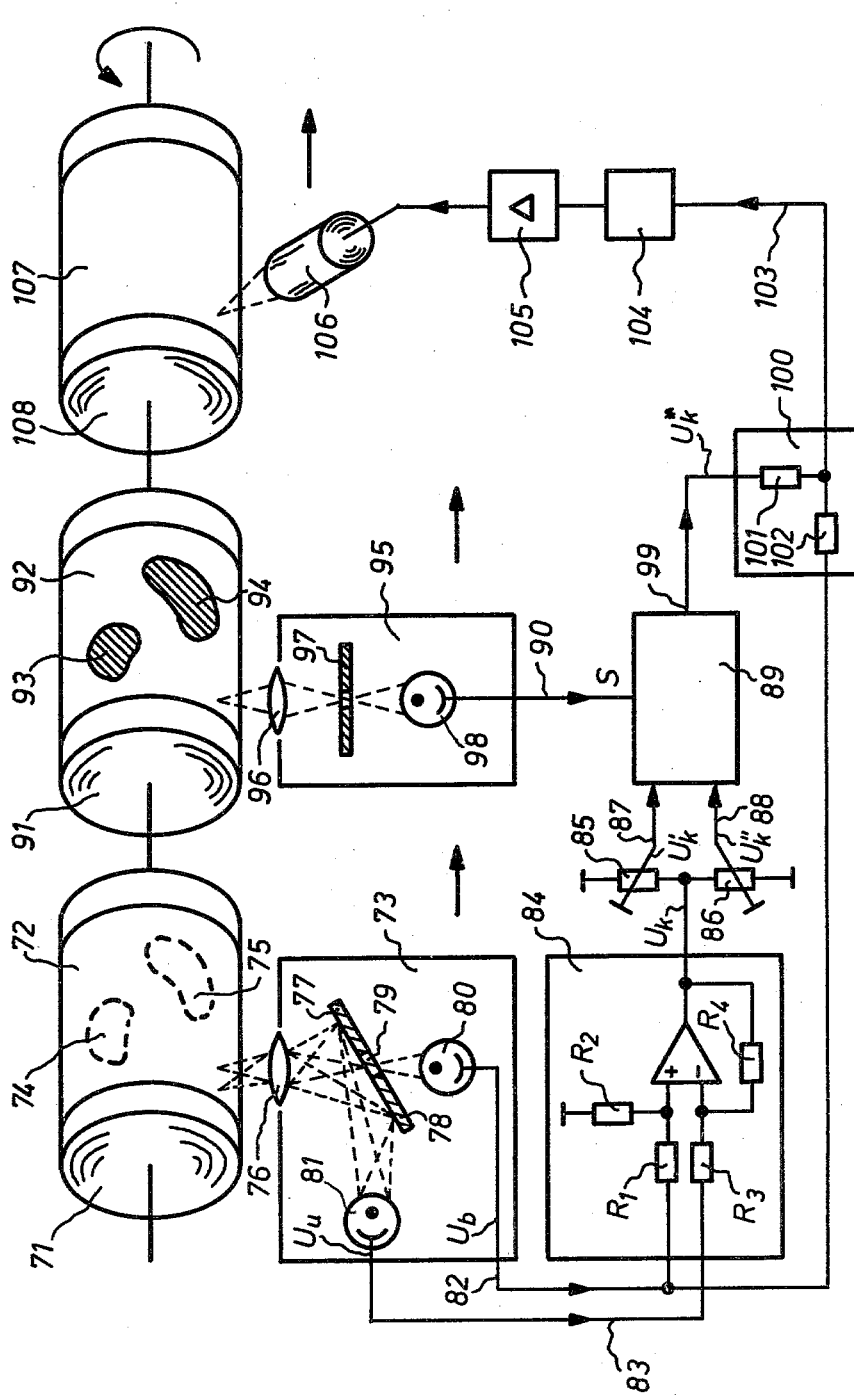
FIG. 6 shows an example of the application of the invention to a black/white scanner.

FIG. 6 shows another example of the application of the invention for a black/white scanner wherein varying definition signals are to become effective in different sections of the image original, the transition from one definition signal to the other occurring gradually at the section boundaries.

An image original 72 which is scanned by dots and lines by a scanning element 73, is clipped on to a scanning drum 71. The sections 74 and 75 of the image original 72 are to be exposed to different definition corrections.

The scanning beam reflected from the image original 72 falls via a lens 76 on to a mirror 77 in the form of a circular annulus, which represents the ambient field diaphragm 78, whereas the aperture in the centre of the mirror forms the image dot diaphragm 79.

The scanning beam arising from the centre of the momentarily scanned picture dot passes via the picture dot diaphragm 79 to a first optoelectronic converter 80 wherein it is transformed into the image signal $U_b$. The beam component reflected by the ambient field diaphragm 78, and originating from the environs of the picture dot, is incident on a second optoelectronic converter 81 wherein the ambient field signal $U_u$ is generated. The image signal $U_b$ on one conductor 82 and the ambient field signal $U_u$ on a conductor 83, are fed to a differential amplifier 84 wherein the ambient field signal $U_u$ is subtracted from the image signal $U_b$ to obtain the correction signal $U_k$.

Two different partial correction signals $U'_k$ and $U''_k$ may be tapped off from potentiometers 85 and 86, on conductors 87 and 88.

The partial correction signals $U'_k$ and $U''_k$ are the input signals, which are to be mixed, for a mixing circuit 89 which is controlled by a poorly defined control signal S carried on a conductor 90. The mixing circuit 89 has the structure shown in FIG. 8.

A mask drum 91 whereon is installed a black/white control mask 92 revolves in synchronism and precise register with the scanning drum 71. The control mask 92 contains the control ranges 93 and 94 positionally co-ordinated with the exposed areas 74 and 75 of the image original 72, which are for example arranged to correspond to "black", whereas the residual part of the control mask 92 is "white".

The control mask 92 is scanned by a scanning element 95 to obtain the poorly defined control signal S on the conductor 90. The scanning element 95 comprises an object lens 96, an image dot diaphragm 97 and an optoelectronic converter 98. For generation of the poorly defined control signal S, the diameter of the picture dot diaphragm 97 of the scanning element 95 is greater than the diameter of the picture dot diaphragm 79 in the scanning element 73. The control signal S may however also be derived from the properties (colour, tonal value, etc.) of the image original 72.

The mixed correction signal $U_k^*$ at the output terminal 99 of the mixing circuit 89 is fed to a superimposition stage 100 situated in the signal path of the image signal $U_b$ and comprising the decoupling resistors 101 and 102, wherein it is additively superimposed in known manner on the image signal $U_b$ to enhance contrast. The superimposition may also be performed in different manner, e.g. in multiplicative manner.

The image signal $U_b$ modified to enhance contrast and carried on the conductor 103 passes via a corrector stage 104 to a terminal amplifier 105. In the correction stage 104, the image signal $U_b$ may be exposed to another modification, for example a gradation adaptation, depending on reproduction requirements.

The output signal of the terminal amplifier 105 controls a recording element 106 which performs the rerecording by dots and lines of the image original 72 on a recording medium 107. The recording medium 107 is clipped on to an equally revolving recording drum 108.

Use may also be made of a simplified mixing circuit which merely comprises a multiplier stage, as compared to the circuitry illustrated in FIG. 8. This multiplier stage is acted upon by the poorly defined control signal S and by the signal which is to be affected. The simplified mixing circuit is advantageously applied if a signal is merely switched on and off whereas the transition is not intended to occur suddenly but gradually.

A preferred application of the simplified mixing circuit occurs for example if a control mask cannot precisely follow the structures at the boundary of very fine picture details (head hair of a person). In this case, it is found to be appropriate to perform corrections in respect of colour, tonal value and definition with gradual transitions.

It is intended to produce a neutral background for a person who is to be placed in a cleared setting, the recording element 106 is acted upon by a contrast image signal corresponding to a particular gray value. In this connection too, it may be useful to record the gray value with gradual transitions at particular sectional boundaries.

Figure 7:
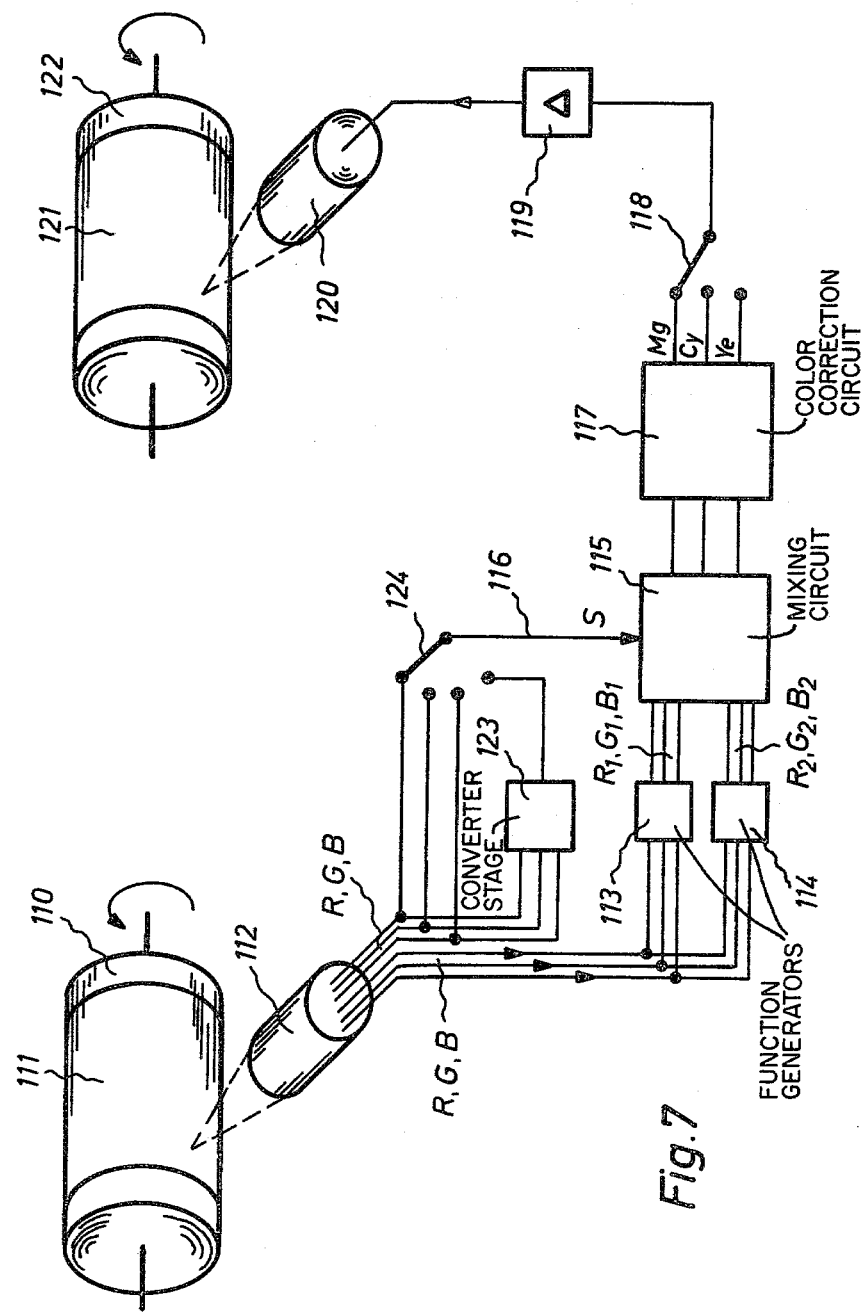
FIG. 7 shows another application of the invention.

FIG. 7 shows another example of the application of the invention in the case of a colour scanner with which locally varying medium brightness values in the image original which is to be reproduced are to be balanced to reproduce picture details throughput the image original with an adequate contrast.

The coloured image original 111 clipped on to a revolving scanning drum 110 is scanned by means of an optoelectronic scanning element 112. By means of a conventional picture dot diaphragm, the scanning element 112 generates three distinct colour mensuration signals R, G, B and at the same time, by means of an enlarged ambient field diaphragm, three poorly defined colour mensuration signals, R', G', B'. This ambient field diaphragm has a diameter which is substantially greater than that of an otherwise customary ambient field diaphragm for diffusion masking or for improving definition. The diametrical ratio may amount to between 1:5 and 1:250, preferably to 1:50.

As compared to the diameter of the standard picture dot diaphragm, the diameter of the ambient field diaphragm applied in this case is for example 50 times greater, whereas the diameter of the conventional ambient field diaphragm is not more than say 3 to 5 times greater.

The sharply defined colour mensuration signals R, G, B simultaneously reach two function generators 113 and 114, which are preset for two different gradation graphs, for example a first gradation for increasing sharpness on bright areas and levelling dark areas, and a second gradation for increasing detail in the shadows and evened out definition in bright areas.

The colour mensuration signals $R_1$, $G_1$, $B_1$, and $R_2$, $G_2$, $B_2$ modified in accordance with the different gradations are mixed in a mixing circuit 115 as a function of a poorly defined control signal S on a conductor 116. The mixing circuit 115 corresponds to the mixing circuits 12 and 17 of FIG. 1.

The mixed colour mensuration signals R, G, B are converted into the chromatic selection signals Mg, Cy and Ye in a colour correction circuit 117. A colour separation selector 118 selects one of the chromatic selection signals, which is fed via an amplifier 119 to a recording lamp 120 acting as a recording element. The recording lamp 120 exposes the required chromatic selection on a film 121 which is situated on an equally revolving recording drum 122.

Any of the poorly defined colour mensuration signals R', G', B' or a signal derived from these signals, may be applied as a poorly defined control signal S for the mixing circuit 115.

The poorly defined control signal S may for example be a brightness signal H which is determined in a converter stage 123 from the poorly defined colour mensuration signals R', G', B' in accordance with the relationship $H = a_1 R' + a_2 G' + a_3 B'$. The poorly defined control signal S may also be derived from the colour grading and/or chromatic saturation, in the converter stage 123.

One of these signals is selected on a switch 124 and fed to the mixing circuit 115 as a control signal S, via the conductors 116.

In a modified embodiment, the generation of the poorly defined colour mensuration signals R', G', B' may be omitted and use may merely be made of the brightness signal generated by scanning an original by means of the enlarged ambient field diaphragm, as a control signal.

It is evident that the otherwise customary ambient field signal for diffusion masking or for increasing definition may complementarily be generated in both cases.

Referring now in particular to FIG. 8, this shows an embodiment of a circuit system for mixing two image signals.

A first signal A is fed via an input terminal 201 to a modulator 202 in a mixing circuit 203, and a second signal B is fed via an input terminal 204 to another modulator 205. The modulator 202 is acted upon moreover by a control signal S fed in via the input terminal 206 and the modulator 205 is acted upon by the control signal (1−S) inverted in amplitude by means of an inverter 207. The control signal determines the starting point and the characteristic of the mixing action.

The modulators 202 and 205 preferably are linear multiplier stages.

The inverter 207 comprises an inverse-feedback operator amplifier whose inverting input terminal is acted upon by the control signal S. The control signal S inverted in amplitude is summated with a constant voltage which is so selected that the output signal of the inverter 207 is equal to nought when the control signal S is at a maximum.

The output terminals of the modulators 202 and 205 are equally connected to a summating stage 210, if appropriate via corrector stages 8 and 9 which are denoted by dashed lines only in FIG. 8. The composite signal $C = S \times B + (1-S) > A$ appears at the output terminal 11 of the mixing stage 203.

As a rule, the corrector stages for a tonal value or and chromatic correction are situated in the signal paths of the signals A, B, or C.

In a preferred version of the mixing stage 203, the corrector stages 208 and 209 are post-connected direct to the modulators 202 and 205, and the summating stage 210 is constructed as a potentiometer having a central tapping. A balanced setting unaffected by the control signal S may thereby be established for the output signals of the modulators 202 and 205.

A mask signal, a chromatic signal or a signal derived from the chromatic signals, is advantageously applied as a control signal S.

FIG. 9 shows the graphs of the signals A and B acted upon in the mixing stage 203 and the composite signal C in a transitional area 212, which is delimited by the values S=0 and S=1 of the control signal S and whose amplitude may be varied by the evolution of the control signal S.

If the control signal S increases steadily within the transitional area 212, the individual graphs of the signals A and B are also even, and a smooth change from the signal A to the signal B occurs within the transitional area 212 in accordance with the graph of the composite signal C.

If the signal A and B are of identical magnitude, the composite signal C is unaffected by the control signal S and directly proportional to the signal A or B.

The control signal S has been shown as rising linearly within the transitional area 212 in FIG. 9. Any optional graph may evidently be envisaged.

We claim:

1. A method for producing printing blocks or formes, in which at least two image signals are mixed electronically to generate a composite signal having a gradual or smooth transition within a mixing range, the method comprising the steps of:
    (a) scanning at least one image opto-electronically point-by-point by means of a first scanning device to generate at least two image signals to be mixed;
    (b) generating a coloured control mask including at least one mask area, said mask and said mask area having different colour information;
    (c) scanning said control mask opto-electronically point-by-point by means of a second scanning device to obtain primary mask colour signals;
    (d) generating an unsharp control signal from at least one mask colour signal by evaluating the colour signals of the actual point and the surrounding points scanned from said control mask, said unsharp control signal having a first level during scanning said control mask, a second level during scanning said at least one mask area and a gradual transition between the levels during scanning the contours of said mask area, said gradual transition defining the gradual transition of said composite signal within the mixing range;
    (e) modulating one of said image signals by said control signals;
    (f) modulating said other image signal by the amplitude-inverted control signal;
    (g) combining the modulated image signal so as to obtain said composite signal, and
    (h) producing printing blocks or formes from said composite signal.

2. A method according to claim 1, wherein the unsharp control signal is generated by unsharp scanning the coloured control mask by means of said second scanning device having a second aperture (unsharp masking aperture) exceeding the first aperture (main aperture) of said first scanning device.

3. A method according to claim 2, wherein the diameter of said second aperture determines the mixing range.

4. A method according to claim 1, wherein said unsharp control signal is distorted non-linearly in the mixing range so as to define the shape of the gradual transition of said composite signal.

5. A method according to claim 1, wherein said control signal is generated from said primary mask colour signals by colour recognition.

6. A method according to claim 1, wherein two of said primary mask colour signals are submitted to a minimum selection to distinguish between the colours "black" and "non-black" in said coloured control mask so as to obtain two different control signals.

7. A method according to claim 1, wherein two of said primary mask colour signals are submitted to a minimum selection to distinguish between the colours "white" and "non-white" in said coloured control mask so as to obtain two different control signals.

8. A method according to claim 1, wherein one of said two primary mask colour signals is inverted in amplitude and wherein the inverted and non-inverted primary mask colour signals are submitted to a maximum selection and a minimum selection to distinguish between two primary mask colours so as to obtain two different control signals.

9. A method for producing printing blocks or formes, in which at least two image signals are mixed electronically to generate a composite signal having a gradual or soft transition within a mixed range, the method comprising the steps of:
(a) scanning at least one image opto-electronically point-by-point by means of a first scanning device to generate at least two image signals to be mixed;
(b) generating an unsharp control signal from at least one image signal by evaluating the image signals of the actual point and the surrounding points scanned from said image;
(c) modulating one of said image signal by said control signal;
(d) modulating one of said image signals by the amplitude-inverted control signal;
(e) combining the modulated image signals so as to obtain said composite signal, and
(f) producing printing blocks or formes from said composite signal.

10. A method according to claim 9, wherein said image is scanned additionally by means of a second scanning device having a second aperture exceeding the first aperture of said first scanning device to obtain unsharp image signals and wherein said unsharp control signal is derived from said unsharp image signals.

11. A method according to claim 10, wherein a luminance signal is derived from said image signals and wherein said luminance signal is applied as said control signal.

12. A method according to claim 9, wherein said image is scanned additionally by means of a second scanning device having a second aperture exceeding the first aperture of said first scanning device to obtain an unsharp luminance signal and wherein said unsharp luminance signal is applied as said unsharp control signal.

13. A method according to claim 10, wherein the ratio between the diameter of the first and second aperture lies between 1:5 and 1:250.

* * * * *